United States Patent
Carlisle et al.

(10) Patent No.: US 8,241,796 B2
(45) Date of Patent: Aug. 14, 2012

(54) ELECTRODES OF A FUEL CELL

(75) Inventors: Otto F. Carlisle, Sussex (GB); Gerard P. T. Sauer, London (GB)

(73) Assignee: AFC Energy plc (GB)

( * ) Notice: Subject to any disclaimer, the term of this patent is extended or adjusted under 35 U.S.C. 154(b) by 972 days.

(21) Appl. No.: 12/281,958

(22) PCT Filed: Mar. 6, 2007

(86) PCT No.: PCT/GB2007/050104
§ 371 (c)(1),
(2), (4) Date: Oct. 16, 2008

(87) PCT Pub. No.: WO2007/102026
PCT Pub. Date: Sep. 13, 2007

(65) Prior Publication Data
US 2009/0233153 A1  Sep. 17, 2009

(30) Foreign Application Priority Data

Mar. 7, 2006 (GB) .................................. 0604596.7
Mar. 7, 2006 (GB) .................................. 0604598.3

(51) Int. Cl.
*H01M 2/14* (2006.01)
*H01M 8/02* (2006.01)
(52) U.S. Cl. ........ 429/400; 429/523; 429/446; 429/508; 429/530; 429/532
(58) Field of Classification Search .................... 429/34, 429/35, 446, 508, 530, 532, 400, 523
See application file for complete search history.

(56) References Cited

U.S. PATENT DOCUMENTS

| | | | |
|---|---|---|---|
| 3,342,641 A | 9/1967 | Burhorn et al. | |
| 3,400,019 A * | 9/1968 | Le Duc | 429/517 |
| 3,912,538 A | 10/1975 | Dews et al. | |
| 3,926,676 A | 12/1975 | Frie et al. | |
| 4,444,852 A | 4/1984 | Liu et al. | |
| 5,053,291 A | 10/1991 | Hirota | |
| 5,480,735 A | 1/1996 | Landsmann et al. | |
| 5,993,987 A | 11/1999 | Wozniczka et al. | |
| 6,040,072 A | 3/2000 | Murphy et al. | |

(Continued)

FOREIGN PATENT DOCUMENTS
EP        292431        11/1988
(Continued)

OTHER PUBLICATIONS

USPTO Office Action for U.S. Appl. No. 12/281,757 dated May 19, 2011.

(Continued)

Primary Examiner — Timothy Vanoy
(74) Attorney, Agent, or Firm — Tumey L.L.P.

(57) ABSTRACT

An electrode for use in a fuel cell consists of a porous plastic substrate, a conductive layer and a catalyst layer, in which the substrate is hydrophilic. Preferably the substrate has a water wicking rate no less than 40 mm per 600 s. Such an electrode may be used in a fuel cell, with an electrolyte chamber (8) defined between two opposed electrodes (11, 12), the electrodes having the catalyst layers (5) facing away from the electrolyte in contact with respective gas chambers (7, 9). Preferably the electrolyte is maintained at a negative pressure during operation.

14 Claims, 3 Drawing Sheets

U.S. PATENT DOCUMENTS

| | | |
|---|---|---|
| 6,218,039 B1 | 4/2001 | Mease et al. |
| 6,989,216 B2 | 1/2006 | Puttaiah et al. |
| 2002/0155341 A1 | 10/2002 | Finkelshtain et al. |
| 2003/0198862 A1 | 10/2003 | Struthers |
| 2003/0207156 A1 | 11/2003 | Ovshinsky et al. |
| 2004/0110049 A1 | 6/2004 | Shimotori et al. |
| 2005/0042497 A1 | 2/2005 | Ronne et al. |
| 2005/0208362 A1 | 9/2005 | Petty et al. |
| 2006/0234106 A1 | 10/2006 | Duffield et al. |
| 2008/0187815 A1* | 8/2008 | Hiromitsu .................. 429/41 |
| 2009/0053565 A1 | 2/2009 | Iacovelli |

FOREIGN PATENT DOCUMENTS

| | | |
|---|---|---|
| FR | 2861219 | 4/2005 |
| GB | 874283 | 8/1961 |
| GB | 951807 | 3/1964 |
| GB | 1051443 | 12/1966 |
| GB | 2065171 | 6/1981 |
| JP | 58093173 | 6/1983 |
| JP | 59184469 | 10/1984 |
| JP | 62268064 | 5/1985 |
| JP | 60124367 | 7/1985 |
| JP | 63178455 | 7/1988 |
| WO | WO 2007/102027 | 9/2007 |
| WO | WO 2007/102028 | 9/2007 |

OTHER PUBLICATIONS

USPTO Office Action for U.S. Appl. No. 12/281,797 dated Oct. 8, 2010.

USPTO Office Action for U.S. Appl. No. 12/281,797 dated Mar. 30, 2011.

PCT International Search Report and Written Opinion for PCT/GB2007/050104 dated Sep. 20, 2007.

PCT International Search Report and Written Opinion for PCT/GB2007/050106 dated Jul. 2, 2007.

PCT International Search Report and Written Opinion for PCT/GB2007/050105 dated Jul. 5, 2007.

* cited by examiner

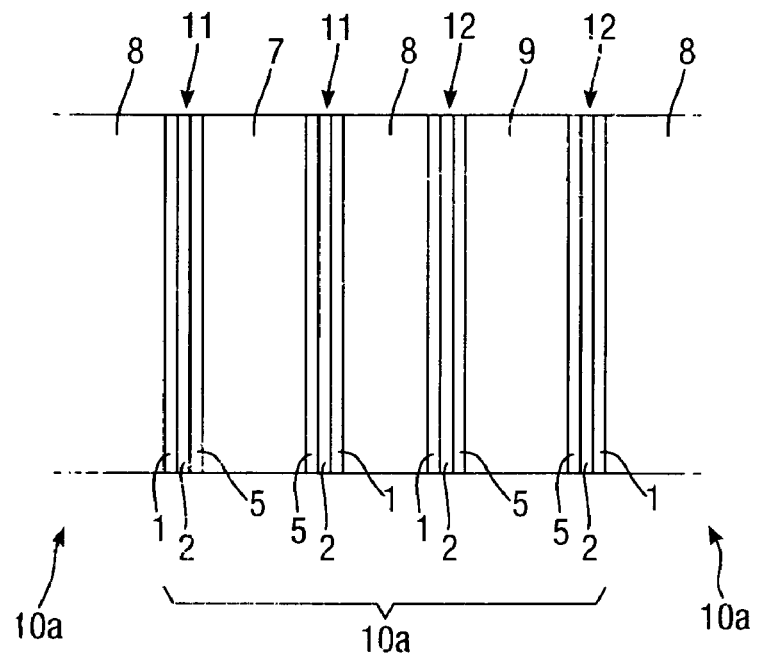
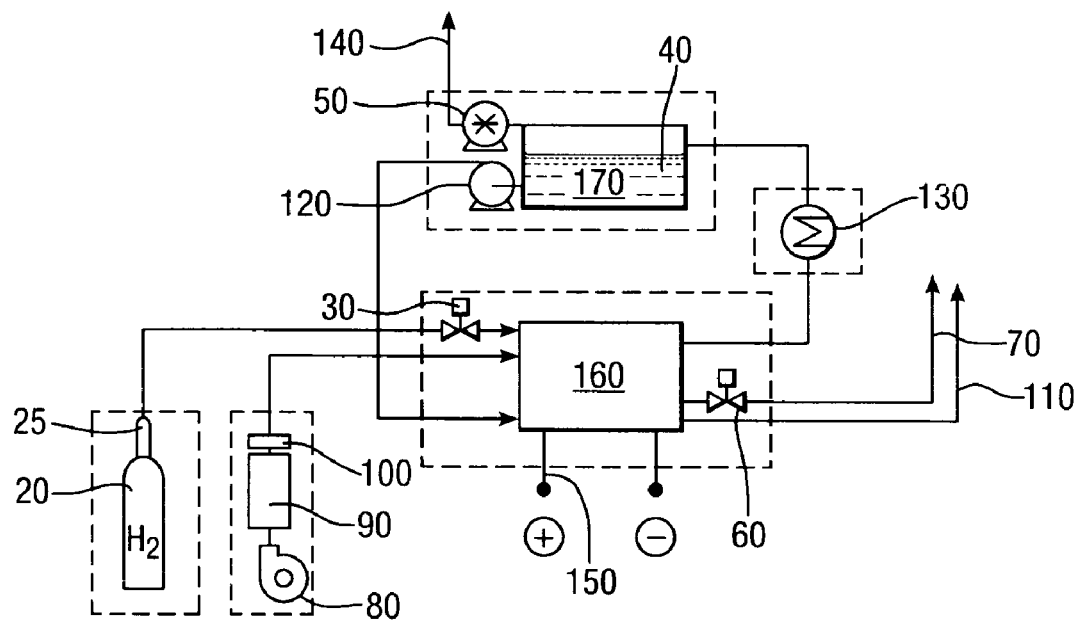

ELECTRODES OF A FUEL CELL

The present invention relates to electrodes that may be used in fuel cells, preferably but not exclusively alkaline fuel cells and also to fuel cell assemblies including the electrodes.

BACKGROUND TO THE INVENTION

Fuel cells have been identified as a relatively clean and efficient source of electrical power. Alkaline fuel cells are of particular interest because they operate at relatively low temperatures, are efficient and rugged. Acid fuel cells and fuel cells employing other aqueous electrolytes are also of interest. Such fuel cells typically comprise an electrolyte chamber separated from a fuel gas chamber (containing a fuel gas, typically hydrogen) and a further fuel gas chamber (containing an oxidant gas, usually air). The electrolyte chamber is separated from the gas chambers using electrodes. Typical electrodes for alkaline fuel cells comprise a conductive metal grid or mesh backbone, typically nickel, that provides mechanical strength to the electrode. Onto the metal mesh or grid is deposited a catalyst as a slurry or dispersion of particulate poly tetra-fluoroethylene (PTFE), activated carbon and a catalyst metal, typically platinum. Such electrodes are expensive, electrically lossy, thick, heavy and suffer from irregular distribution of catalyst. Furthermore, the nickel mesh is prone to breakage and causes local irregularities and unwanted variations in electric field due to resistance at the contact points between the wires of the mesh.

A problem with many known fuel cell assemblies is that liquids (typically water), that are a product of the chemical reactions occurring at the electrodes, are trapped in the gas chambers, and the liquid has to be removed from the gas chambers by a water management system including pumps, dehumidifiers, drainage channels or the like adding to the complexity of fuel cells. The loss of liquid reaction products from the electrolyte chamber also means that the electrolyte needs to be constantly topped up either with recycled lost liquid or additional fresh liquids. Furthermore, the presence of the liquid reaction products (especially water) in the fuel cells reduces the capability of fuel cells to operate at low temperatures approaching the freezing point of the liquids.

Some of the problems had been previously addressed by Shell (UK patents 874,283 and 951,807) who deposited a conductive metal layer onto a relatively non-conductive, porous, rigid substrate made of Porvic® a sintered microporous polyvinylchloride (PVC) material. The electrodes of Shell were still relatively thick and the process used to manufacture the Porvic® substrate used chemicals that require careful handling and disposal. Furthermore, the Porvic® plastic material is hydrophobic (requiring alcohols such as n-propanol or n-butanol in order to wet the substrate) and so aqueous electrolytes are not readily absorbed into the pores of the electrode substrate.

DISCUSSION OF THE INVENTION

The electrode of the present invention addresses or mitigates one or more problems of the prior art.

There is provided in accordance with the present invention, an electrode for use in a fuel cell, the electrode comprising a porous permeable plastic substrate, a conductive layer and a catalyst layer, wherein the substrate is hydrophilic.

The term permeable means permeable to an aqueous electrolyte (such as potassium hydroxide) such that, in use, electrolyte may pass into the substrate to make intimate contact with the layer of conductive material and the catalyst.

The term "hydrophilic" refers to a substance with an affinity for water. The substrate is hydrophilic such that electrolyte (which in the case of alkaline fuel cells is an aqueous solution of, for example, potassium hydroxide) may enter the pores of the porous substrate. The hydrophilic nature of the substrate means that water spreads on the surface of the substrate. In contrast hydrophobic materials repel water, which forms beads on the surface, the contact angle being greater than 90°. Preferably the substrate has a water contact angle of no greater than 90°, more preferably no greater than 60° and especially no greater than 45°. The lower the contact angle the greater the hydrophilicity of the substrate. In some preferred embodiments the substrate has a zero contact angle with water, such that the substrate is wetted by water.

Another property linked to the hydrophilicity of a substance is the surface energy (or surface tension). The substrate advantageously has a surface energy of greater than 40 mJ/m² (40 dynes cm⁻¹), preferably no less than 50 mJ/m², more preferably no less than 60 and especially no less than 70 mJ/m². The hydrophilic substrate may attract water in a sponge-like manner being instantly wettable. In contrast, a substrate without any chemical affinity for the electrolyte would result in the electrolyte entering the pores to a lesser degree due to surface energy effects, thus dramatically reducing the performance and/or efficiency of the electrode.

The substrate substantially consists of a plastics material. Plastics materials are used as they typically have one or more advantageous properties when used in an electrode such as being uniform in structure, flexible, easy to mass-produce and capable of being made very thin whilst maintaining a suitable level of mechanical strength without becoming brittle. In a preferred embodiment, the substrates of the electrodes are made from hydrophilic plastics materials. However, most plastics materials are relatively hydrophobic, for example, polyethylene (PE), polypropylene (PP), polystyrene and poly vinyl chloride (PVC) have surface energies between 29 and 39 mJ/m². Such materials are not wetted by water but are wetted by less polar solvents such butanol. Preferably the plastics substrate of the invention is treated to increase the hydrophilicity of the substrate. For example, a PE, PP or polystyrene substrate may be treated in order to increase the surface energy of the substrate to more than 40 mJ/m².

Suitable treatment processes include grafting processes whereby chemical groups are attached to the polymer backbone without scission of the polymer chain. For example, a PP, PE or combined PP/PE polymer may be grafted in a process in which free radicals are created in the polymer surface by abstraction of hydrogen atoms using UV radiation in the presence of a photo-initiator and then hydrophilic monomer units combine with the radical. Such a process enables hydrophilic vinyl monomer units to be grafted onto a hydrophobic polymer chain. Grafting techniques may advantageously enable the entire surface of the polymer to be treated including the inside of pores so significantly increasing the ability of the material to draw up water (sometimes known as the wicking characteristics). Other treatment techniques such as coating the substrate may also be used, but are less preferred than grafting processes as they have been found to be less efficient in increasing the wicking characteristics.

The mean pore size of the porous substrate may be between about 0.2 μm and about 40 μm. It is preferred that the mean pore size is between about 2 μm and about 15 μm, for example from about 5 to 10 μm.

Advantageously, the hydrophilicity and the pore size of the substrate material are such that the water bubble point of the porous substrate is from 5 to 20 kPa (50 to 200 mbar) gauge, preferably from 8 to 15 kPa gauge, more preferably from 8 to 14 kPa gauge and especially from 8 to 13 kPa gauge. The bubble point for a given fluid (such as water) is the pressure required to force air through a substrate, the test being performed accordingly to ASTM method F316.

Advantageously, the substrate material has a high water wicking rate. The wicking rate of a material is the distance a liquid travels into a substance over a given time period (for example, in mm per 600 s). The wicking rate is dependent on the porosity and the hydrophilicity of a material. Increases in porosity or in hydrophilicity lead to higher wicking rates. The wicking rate of a material can be measured by using any appropriate standard test such as the SciMAT Material Test Method (MTM) 320. Preferably the substrate has a wicking rate of no less than 40 mm per 600 s, more preferably a wicking rate of no less than 50 mm per 600 s and still more preferably no less than 65 mm per 600 s, for example, a wicking rate of approximately 90 mm per 600 s. A high water wicking rate facilitates rapid distribution of the aqueous electrolyte through the substrate.

Advantageously, the porous substrate consists of a plastics material that has a uniform structure providing an electrode substrate with consistent properties throughout. Preferably, the plastics material is readily available and can be used to mass produce substrates. For example, the plastics material may be rolled into a roll and used in mass production techniques. The plastics material is preferably flexible enabling thin electrodes to be produced without the electrodes being brittle. If a rigid plastics material is used it is advantageously non-brittle. The non-brittle nature of substrates made from plastics materials has been found to render then preferable to other potential hydrophilic substrate materials such as porcelain or glass which are fragile. The substrate may be a polymer such as a polyamide or a polyolefin, and preferably it is a polyolefin. The substrate preferably comprises one or more of treated polyethylene and polypropylene, which produce good results being hydrophilic, flexible and having a uniform structure. Treated polystyrene may also be suitable. Substrates constructed of spun fibre and/or spun bonded plastics materials are preferred, those substrates having been found to be most suited for use in the electrodes of the invention. Substrates made of wet laid or meltblown plastics materials may also be used but are less preferred. Treated spun fibre PP/PE plastics materials sold by SciMAT Ltd of Swindon, UK have been found to be particularly suited for use in making the substrates for the electrodes of the invention. For example, the material sold under the SciMat reference number 700/70 and similar products (such as others sold under reference numbers 700/77) have been found to be suitable for use in the invention. Treated high density polyethylene (HDPE) sold under the trade name Tyvek® by DuPont may also be suitable for use in the invention; for example such a PE membrane may be rendered hydrophilic by treatment with a concentrated acid, such as sulphuric or acrylic acid.

The substrate is relatively thin, allowing small fuel cells and/or fuel cells comprising a large number of electrodes in a small space to be produced. Advantageously, the substrate is as thin as possible whilst still providing adequate mechanical strength to support the electrode at the pressure differentials found in fuel cells. The substrate is preferably no greater than 0.7 mm thick, and more preferably no greater than 500 µm thick. The substrates of the invention are typically of a thickness of from about 100 to 250 µm, for example about 125 µm thick.

The porous substrate is generally of a low conductivity compared to the conductive layer. The conductive layer comprises one or more materials that are of sufficient electrical conductivity that the electrode may function as an electrode. Advantageously, the conductive layer is substantially uniform. Preferably, the conductive material is a substantially uniform layer of material that is distributed across the whole of one surface of the substrate. Having a uniform layer is possible as the conductive layer is porous to the electrolyte enabling the electrolyte and the fuel gas to come into contact. A uniform layer, rather than a discontinuous grid or other uneven distribution of conductive material, has been found to provide an adequate electrical conductivity using a thin layer. Advantageously the conductive layer comprises conductive materials having an electrical resistivity of no greater than 0.2 µΩm, preferably no greater than 0.1 µΩm and more preferably no greater than 0.06 µΩm. The conductive materials advantageously comprise metals, as metals are conductive and may be deposited in very thin layers by a variety of methods including deposition by electro-less plating, vacuum evaporation deposition and also electroplating. The conductive materials may comprise one or more of gold, palladium, platinum, silver, copper and nickel which are highly conductive metals and preferably silver, copper and nickel which are relatively inexpensive. The conductive layer may comprise separate sub-layers comprising different conductive materials, with a first sub-layer in intimate contact with the porous substrate and a further sub-layer of the same or differing material deposited on the first layer. For example, a layer of silver may be deposited on the substrate by electro-less plating or vacuum evaporation deposition, with a further layer of nickel then deposited on the silver by electroplating. The provision of a plurality of sub-layers allows subtle engineering of the electrode properties and permits materials to be used in the second conductive layer that would not deposit easily onto the porous substrate.

It is preferred that a layer of conductive material, for example a first sub-layer, is deposited onto the relatively non-conductive substrate by electro-less plating. Vacuum evaporation deposition may also or alternatively be used to deposit the first or subsequent layers of metals. Advantageously the first layer of conductive material is no more than 2 µm thick, preferably no more than 1 µm thick for example approximately 0.5 µm thick. The second, third or subsequent layers preferably comprise material deposited by electroplating. The total thickness of the layers of conductive material may be between about 0.5 and about 10 µm, preferably about 0.5 to about 7 µm, more preferably about 1 to about 5 µm.

It is preferred that the conductive layer of the electrode is further provided with a protecting layer overlying the uppermost of the layers comprising conductive material. The protective layer is to prevent corrosion of the underlying conductive materials, so it preferably comprises a material of greater corrosion resistance with respect to the electrolyte than that of the uppermost conductive material layer. The protective layer may also be conductive to electricity. Advantageously, the protective layer comprises materials selected for their resistance to corrosion in the cell conditions (for example in the presence of a hot KOH aqueous electrolyte). The materials of the protective layer may alternatively be a sacrificial layer that is corroded in preference to the underlying conductive material which, for example, may be more expensive. The protective layer may comprise any one or more of gold, rhodium or nickel which have been found to exhibit an adequate degree of resistance to corrosion in fuel cells (such as KOH alkaline fuel cells) whilst also providing an acceptable degree of electrical conductivity. The protective layer enhances the durability and life-expectancy of the electrode. The protective layer may have a thickness of about 5% to about 50%, preferably about 5% to about 20% and more preferably about 5% of the total thickness of the layers comprising conductive material.

Advantageously, the protective layer is less than 2 µm thick, preferably from 0.02 to 1.5 µm thick.

The entire conductive layer, including all conductive sublayers and any optional protective layers, is preferably no greater than 10 µm thick, especially no greater than 6 µm thick. Conductive layers of approximately 6 µm thick have been found to allow the passage of the electrolyte through the conductive layer. In order for the electrolyte to come into contact with the fuel gas at the catalyst layer, it is necessary for both the substrate and the conductive layer to be permeable to the electrolyte.

The uppermost layer of conductive material or the protective layer may be chosen so as to act as a catalyst e.g. platinum metal. However, it is often more convenient and cost-effective to deposit a relatively inexpensive layer or layers comprising conductive material and then form a catalyst layer comprising catalyst material on the layer or layers comprising conducting material or on the protective layer, if present. The catalyst layer is preferably deposited so as to overlie the other layers applied to form the electrode. Preferably, the catalyst layer is applied by a spray technique, thus providing a high surface area, so maximising the catalyst activity and enabling a thin layer of expensive catalyst to be employed.

The catalyst layer may comprise a binding agent. The binding agent may increase adhesion of catalyst to the underlying layer. The binding agent is advantageously resistant to the operating temperature and pressure of the fuel cell and is selected to be resistant to the electrolyte employed in the fuel cell such as a highly corrosive KOH solution. The binder may be any one or more of bitumen, rubber, polystyrene, polyethylene or polypropylene and is preferably polyethylene or polystyrene. The presence of the binding agent may also enhance the suitability of the catalyst for application by a spray-technique.

The catalyst layer preferably comprises as a catalytic material activated carbon, a metal or a metal oxide. The metal or metal oxide may be chosen from one or more of palladium, platinum, ruthenium, rhodium, nickel and gold (or oxides of such metals). Such metals provide excellent catalytic properties for the reactions that occur in fuel cells, particularly alkaline fuel cells. The catalyst layer may comprise both a metal and activated carbon. It is preferred that the catalyst comprises a catalytic metal or metal oxide, deposited onto or in carbon black. In this case, the term "catalytic material" is taken to mean that material which actively catalyses the reduction or oxidation processes that occur at the electrode.

Fuel cell electrodes are generally constructed as flat plates, typically rectangular plates. The electrode plates have two substantially flat and mutually opposed faces (herein after referred to as "surfaces") and typically four thin edges, each of the two flat opposed faces (surfaces) having a large area relative to the edges. The conductive and catalyst layers of the electrodes of the invention are on at least one of the large flat surfaces of the electrodes.

A second aspect of the present invention provides a method of making an electrode for a fuel cell, the method comprising the steps of forming a hydrophilic electrode substrate from a plastics material and applying a uniform conductive layer to the substrate. The step of forming the substrate may include a step of treating a plastic material in order to render the material hydrophilic. Preferably the treating step includes a free radical mediated grafting process. Preferably the plastics material of the substrate is treated to add vinyl units to the surface of the material.

As discussed above in relation to the electrode itself, the method then preferably involves deposition of conductive layers, the first of which may be deposited by electro-less plating; then preferably a protective layer for corrosion resistance. And then a catalyst layer is deposited, preferably by a spraying technique. Preferably the catalytic material, binder and any further optional constituents of the catalytic layer are mixed with a solvent to form a mobile mixture (for example a solution, suspension, slurry or the like) that can be sprayed onto the electrode.

There is provided in accordance with a third aspect of the present invention a fuel cell assembly comprising at least two electrodes in accordance with the first aspect of the present invention. The electrodes, and in particular the catalysts of the electrodes, may have different compositions, since one will act as an anode and one will act as a cathode. Each electrode has two mutually opposed surfaces with preferably only one of said surfaces being provided with a catalyst layer, wherein the catalyst layer of each electrode is exposed to a gas chamber. In particular, two electrodes of the fuel cell assembly may be mutually spaced so as to form an electrolyte chamber therebetween, a first gas chamber for a first gas being provided on the opposite side of a first electrode from the electrolyte chamber, and a second gas chamber for a second gas being provided on the opposite of a second electrode from the electrolyte chamber, the side of each of the electrodes that is provided with the catalyst layer being exposed to the gas chambers.

In operation a chemical reaction occurs between the electrolyte and the fuel gases of fuel cells, catalysts being provided on the electrodes in order to catalyse the reactions. In order for fuel cells to perform well, it is necessary for the interface between the electrolyte and the fuel gases to be maintained at the catalyst of the electrodes. The use of a hydrophilic plastic substrate makes this easier to achieve.

The hydrophilic substrates of the electrodes of the first aspect of the invention are permeable to aqueous fuel cell electrolytes. Accordingly the electrodes of the invention enable fuel cell assemblies to be provided, in which the surface of the substrate having a catalyst layer on it is exposed to a gas chamber and the non-catalytic opposite surface of the electrode is exposed to an electrolyte chamber. The wicking ability of the hydrophilic substrate material enables aqueous electrolyte (for example an aqueous KOH electrolyte solution) to be drawn through the pores of the substrate during operation of the fuel cell and come into contact with the gas at the catalyst layer on the other side of the electrode, so the interface between the electrolyte and the fuel gas occurs at the catalyst. The relatively fragile side of the electrode on which the catalyst layer is outermost is not in direct contact with the aggressive electrolyte solutions. In contrast, the more robust substrate side of the electrode is in direct contact with the electrolyte in the electrolyte chamber.

Each of the first and the second gas chambers may be shared between two cell units, thus reducing the number of gas chambers required. For example, an oxidising gas chamber (such as an air circuit conduit) may be bounded by two cathodes whereas a fuel gas chamber (such as a hydrogen circuit) may be bounded by two anodes. Preferably, a plurality of oxidising gas chambers are connected to each other in parallel. Preferably, a plurality of fuel gas chambers are also supplied in parallel.

The fuel cell assemblies of the invention are preferably operated with a pressure differential between the electrolyte and each of the gases. The invention provides a fuel cell assembly comprising a device for maintaining a pressure differential between the electrolyte chamber and a gas chamber. The invention also provides a method of operating the fuel cell assembly of the invention, in which there is a pressure differential across the electrodes between an electrolyte chamber and a gas chamber. Preferably the pressure differential is no less than 5 kPa (50 mbar), more preferably the pressure differential is no less than 8 kPa and still more preferably the pressure differential is no less than 10 kPa. The oxidising gas and the fuel gas may be at equal pressures, or their pressures may differ.

The fuel cell assemblies of the present invention comprising electrodes having hydrophilic substrates have been found to be particularly suited for operation with a pressure differential between the electrolyte on one side of the electrode and a gas on the other side of the electrode. The pressure differential enables the interface between the gas and the electrolyte to be controlled during operation so that the interface is at the catalyst, while ensuring the electrolyte does not leak into the gas chamber. The pressure differential required is lower than the bubble point of the electrode, the overall bubble point of the electrode being largely determined by the bubble point of the plastic substrate (the addition of the conductive and the catalyst layers raising the bubble point of the electrode slightly). The pressure differential across a fuel cell electrode having a water bubble point of 10 kPa gauge will be approximately 8 kPa.

The invention provides a method of operating a fuel cell assembly, in which liquid produced by a chemical reaction occurring at an interface between the gas and the electrolyte is drawn through the electrode into the electrolyte chamber. The hydrophilic nature of the electrode substrate and the pressure differential across the electrodes enable liquid products of chemical reactions occurring at the electrodes (especially water) to be drawn into the electrolyte chamber. Thus, the need for management systems such as dehumidifiers to remove liquids from the gas chambers and chambers is reduced.

The invention provides a method of operating a fuel cell, in which the rate of absorption of water from the gas chamber into the electrolyte chamber is such that the concentration of the electrolyte is substantially constant. Water is produced in an electrochemical reaction at the anode (i.e. the negative electrode) of an alkaline fuel cell and is drawn into the electrolyte. The excess water produced in the cell evaporates at the cathode into the air stream, and so the concentration of the electrolyte may be maintained at a substantially constant, self-regulating level. As the concentration of electrolyte decreases, the water vapour pressure increases, and more water therefore evaporates. The need for water management systems to control and monitor the concentration of the electrolyte and replace water lost through the electrochemical reaction at the cathode is therefore reduced.

The invention provides a method of operating a fuel cell assembly, in which the rate of production of water by the cell and the rate of water lost by evaporation are in equilibrium.

The amount of water lost to evaporation can be regulated by a number of variables. Those variables include the hydrophilicity of the electrode dividing the electrolyte and the gas (a highly hydrophilic electrode drawing water back into the electrolyte more readily). The pressure differential across the electrode of the electrolyte also affects the rate at which water is drawn into the electrolyte; also, the higher the concentration of a KOH electrolyte, the more water is drawn into the electrolyte chamber: concentrations of KOH of 4.5 to 7 molar have been found to be satisfactory in drawing water into the electrolyte at 65° C. The concentration of the KOH electrolyte also affects the evaporation rate. The flow rate of gases may also be adjusted so that the level of evaporation is balanced with that of the water production, air flow rates set so that around three times the required amount of oxygen passes through the cell than is required by the chemical reactions of the cell being typical.

Embodiments of the fuel cell assemblies of the invention including electrodes with hydrophilic substrates that enable water to be drawn through the electrodes, have been found to be more suited for use in low temperature environments than conventional fuel cells. As there is no free water, but only KOH solution, the fuel cell assemblies have been found to be less susceptible to problems caused by freezing of free water on the electrodes, in gas chambers and in water management systems.

The presence of water at the catalyst layer of an electrode reduces the efficiency of the catalyst preventing the reactants (oxidant or fuel gas and electrolyte) coming into contact with the catalyst surface. The arrangement in which water is automatically drawn back into the electrode enables the assembly to operate efficiently and productively by reducing the amount of water that is present on the catalyst surface. This is in contrast to previous fuel cell assemblies in which excess water runs down the surface of the catalyst before being removed from the gas chamber.

The invention provides a method of operating a fuel cell assembly, in which the electrolyte in the electrolyte chamber is maintained at a negative pressure. In one embodiment, the invention provides a fuel cell assembly comprising at least one fuel cell and a pump, the fuel cell including a plurality of gas chambers, an electrolyte chamber and a plurality of electrodes, the pump being arranged to reduce the pressure of an electrolyte in the electrolyte chamber to a negative pressure. In particular the invention provides a fuel cell assembly in which the boundary between an electrolyte chamber and a gas chamber is at least partially defined by a porous electrode comprising a catalyst, the fuel cell being arranged so that in operation a liquid electrolyte fills the electrolyte chamber and a gas fills the gas chamber, the interface between the electrolyte and the gas at least partly occurring at an electrode. In operation a pressure differential is established between the liquid electrolyte in the electrolyte chamber (which is maintained at a negative pressure), and the gas in the gas chamber. It has been found to be particularly advantageous to operate fuel cell assemblies that include electrodes with hydrophilic substrates at a negative electrolyte pressure. However, having a negative electrolyte pressure is also beneficial in fuel cells without a hydrophilic substrate. Therefore all methods of operating a fuel cell assembly in which the electrolyte has a negative pressure in the electrolyte chamber are within the scope of the present invention.

The terms "positive pressure" and "negative pressure" used herein refer to pressures with respect to atmospheric pressure, also known as relative or gauge pressures. The term "pump" used herein refers to a mechanism for lowering the pressure of a fluid and encompasses suction devices, devices for expanding the volume of a chamber and the like.

The fuel cell may be arranged so that in operation the liquid electrolyte is at a negative pressure in the range of from −5 to −15 kPa. Preferably the fuel cell is arranged so that in operation the liquid electrolyte is at a negative pressure of at least −5 kPa, more preferably at least −8 kPa and still more preferably approximately −10 kPa. Maintaining the electrolyte at a negative pressure has been found to be an efficient way of establishing a pressure differential between the electrolyte and the gases of a fuel cell.

The fuel cell assembly of the invention is advantageously arranged so that, in operation, the gases in the gas chambers may be maintained at a positive pressure for example of at least +1 kPa such as approximately +2 kPa. Preferably, the fuel cell assembly includes a gas pressure regulator for maintaining the gases in the gas chambers at positive pressures during operation. The pressure of the fuel gas and the oxidant gas may be the same or they may be different. The provision of gas at a positive pressure assists the flow of gases to the gas chambers of the fuel cell to replace gas consumed in the chemical reactions of the cell, so for example the air may be supplied at 2.5 kPa such that the pressure is 2.0 kPa in the gas chamber and at 1.5 kPa at the outlet. A positive pressure of approximately +2 kPa has been found to be sufficient to supply gas flow to the gas chambers for both a fuel-gas and an oxidant-gas. Alternatively the fuel cell may be so arranged that the gas in the gas chamber is maintained at atmospheric pressure, the entire pressure differential being provided by the negative electrolyte pressure. Preferably the fuel cell is arranged so that in operation the gas is at a low positive pressure of no greater than +8 kPa and more preferably no greater than +5 kPa. The provision of gases at relatively low pressures allows the construction of fuel cells to be simpler than those needing to withstand high gas pressures. Furthermore, the reduced need to provide gases at high pressure in the fuel cell assemblies of the invention may allow them to be run more efficiently than prior-art assemblies in which a considerable amount of energy is required to run compressors and the like to maintain high gas pressures.

The containing of gases at high pressures (for example, a pressure of approximately +10 kPa) poses technical problems that constrain the design of fuel cell assemblies. In particular, the containing of fuel gases such as hydrogen, which permeate relatively easily through barriers at high pressures, is not straightforward. In order to accommodate gases at high pressures without leaking a fuel cell requires a complicated design and/or careful construction, for example with appropriate seals that are not permeable to high pressure fuel gases. The fuel cell assemblies of the present invention that are operated with a pressure differential between the electrolyte and the gases that is at least partly established by maintaining the electrolyte at a negative pressure may circumvent some of the problems associated with designing a fuel cell assembly to withstand high gas pressures. The design of fuel cell assemblies arranged to operate with negative electrode pressures has been found to be more straightforward. The containing of aqueous electrolytes at negative pressures has been found to be more easily achieved than containing gases at high pressures. Furthermore, it enables the pressure differentials between each of the gases and the ambient atmosphere and between the electrolyte and the ambient atmosphere to be modest, which simplifies construction.

A further advantage of fuel cell assemblies that operate with the electrolyte at a negative pressure is that the concentration of the electrolyte can be more easily controlled. Preferably the concentration of the electrolyte is controlled by adjusting the electrolyte pressure. For example, when the electrolyte is KOH it has been found that lowering the KOH pressure (so it is more negative) causes the KOH concentration to decrease (as more water is drawn in from the anode), which in turn causes the vapour pressure to rise and that increases the rate of evaporation. As the vapour pressure is affected by concentration and temperature, and affects the evaporation rate, the KOH pressure can be used to control the KOH concentration balance. As the concentration of electrolyte (KOH) increases, the vapour pressure of water above it falls. This provides a convenient means of control. Thus at a suitable temperature, say 60° C., water from the reaction from the oxidation of hydrogen at the anode will evaporate from the cathode (air electrode) until a constant concentration is achieved. Provided that the air flow is proportional to the current drawn from the cell, stability will result. It will be appreciated that a similar result is to be expected with other electrolytes.

A further advantage of the fuel cells of the present invention in which a pressure differential is at least partly provided by maintaining the electrolyte at a negative pressure is that the flooding of the fuel cell gas chambers with electrolyte on shutting down the fuel cell is facilitated. On shut down, the negative pressure of the electrolyte is no longer maintained, and as the electrolyte pressure rises to or above ambient pressure the interface between the electrolyte and the gas shifts so that the electrolyte flows through the electrodes and into the gas chambers. In a preferred embodiment a tank of electrolyte is provided in an elevated position with respect to the gas chambers of the cell and so electrolyte stored in the tank drains from the electrolyte chamber through the permeable electrodes into the gas chambers filling the electrolyte and gas chambers with electrolyte. The fuel cell can then be stored in a flooded state which eliminates the need for the dormant fuel cell to be purged with inert gas (such as nitrogen) whilst inoperative. Thus, the need for a separate pacification system that supplies and maintains inert gas in the gas chambers on shut down is reduced thereby reducing the number of components, the weight, volume, cost, complexity and number of control systems of the fuel cell. On starting up the fuel cell, the arrangement by which the negative electrolyte pressure is attained is also advantageously able to evacuate the electrolyte from the gas chambers into the electrolyte chamber of the fuel cell and into the optional storage tank.

DESCRIPTION OF SPECIFIC EXAMPLES

Specific embodiments of the invention will now be described by way of example.

FIGS. 2 and 3 show schematic representations of embodiments of fuel cells;

FIG. 4 shows a schematic representation of a fuel cell assembly including a stack of fuel cells (of either FIG. 2 or FIG. 3);

Figure 1:
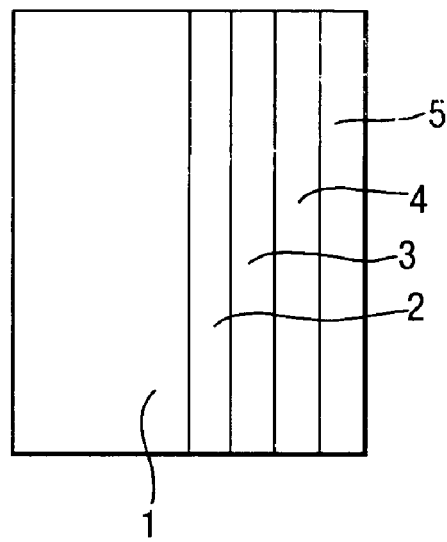
FIG. 1 shows a schematic representation of an embodiment of an electrode.

Referring now to FIG. 1, an electrode is built up of three main parts: a porous permeable substrate 1, a conductive layer comprising layers 2 and 3 of conductive materials and an optional layer 4 of protective material, and a catalyst layer 5.

The Substrate

In each of the examples the substrate 1 is a microporous sheet of polypropylene plastics material (SciMAT 700/70), which is hydrophilic and has an approximate thickness of between 100 to 400 μm, such as 125 μm, and a bubble point of between 8.0 to 15.0 kPa gauge. This material has a wicking rate of 90 mm per 600 seconds.

The Conductor

Example 1

A 0.5 μm layer of silver is electro-less plated onto the substrate 1 to form a first layer 2 of conductive material. A second layer 3 of silver of thickness 3 μm is then electroplated onto the first layer 2 of conductive material. A protective 0.05

μm thick layer 4 of rhodium is then electroplated onto the second layer 3 of conductive material to complete the conductive layer structure.

Example 2

A 0.5 μm layer of silver is electro-less plated onto the substrate 1 to form a first layer 2 of conductive material, followed by electroplating copper to form a second layer 3 of thickness 5 μm of conductive material, followed by electroplating a protective layer 4 of nickel, 1 μm thick.

Example 3

A 0.5 μm layer 2 of silver is electro-less plated onto the substrate 1 to form a first layer of conductive material, followed by electroplating 5 μm thickness of nickel to form a second layer 3 of conductive material.
The Catalyst Mixture The example catalyst mixtures for both cathode and anode electrodes use a combination of catalyst, binder and solvent which are spray-coated onto the conductor layers of Examples 1, 2 and 3 above. The binder may for example be polyethylene (such as PE1020 from Exxon-Mobil), and the solvent isododecane. Percentage weights refer to the total mass of the dry materials before the addition of a suitable solvent.

The cathode catalyst mixtures A to C below include an oxygen reduction catalyst.
  A. Activated carbon, with 10% binder and solvent.
  B. 10% Pd/Pt on activated carbon, with 10% binder+solvent.
  C. Silver on activated carbon, with 10% binder+solvent.

The anode catalyst mixtures D and E below include a hydrogen oxidation catalyst.
  D. Nickel-aluminum alloy powder with activated carbon, with 10% binder and solvent.
  E. 10% Pd/Pt on activated carbon, with 10% binder+solvent.

Figure 2:
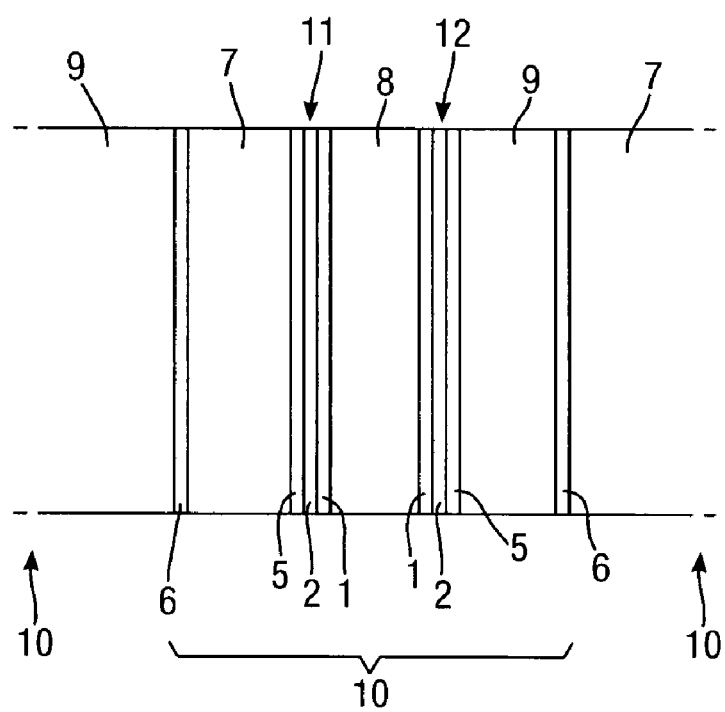

Referring now to FIG. 2, a fuel cell 10 comprises two electrodes 11 and 12, each with two mutually opposed surfaces, one of which has the catalyst layer 5 and the other is the substrate layer 1, as described above in relation to FIG. 1. The anode 11 and cathode 12 (which may differ in the nature of the respective catalyst layer 5, as described above) are mutually spaced so as to form an electrolyte chamber 8 between them. A hydrogen gas chamber 7 for hydrogen gas is provided on the opposite side of the anode 11 from the electrolyte chamber 8, and an oxygen gas chamber 9 for air is provided on the opposite of the cathode 12. The catalyst side of each of the anode and cathode 11, 12 (i.e. the side with the catalyst layer 5) is exposed to the gas chambers, so the substrate side (i.e. the side that is not provided with a catalyst layer) is exposed to the electrolyte chamber 8. On the other side of the gas chambers 7, 9 from the electrodes is provided a bipolar plate 6 that separates a gas chamber 7, 9 of one type from a further gas chamber 9, 7 of the other type in an adjacent fuel cell 10.

Referring now to FIG. 3, there is shown an alternative arrangement of fuel cells 10a in a stack, each fuel cell 10a being of similar construction to that of FIG. 2 except that each gas chamber 7, 9 is bounded by two electrodes of the same type. Thus the hydrogen chamber 7 is bounded by two anodes 11 whereas the air chamber 9 is bounded by two cathodes 12. As in the embodiment of FIG. 2, the catalyst layers 5 of each of the electrodes 11, 12 in FIG. 3 are exposed to the gas chambers 7, 9 whereas the substrate side of the electrodes 11, 12 are exposed to the electrolyte chambers 8. In this arrangement each gas chamber 7 or 9 is shared between two fuel cells 10a within the stack (apart from the end cells of the stack). The reduction in the number of gas chambers of the fuel cell stack arrangement of FIG. 3 compared with that of FIG. 2 may enable a more compact fuel cell stack to be constructed with fewer gas conduits.

In both the embodiments of FIG. 2 and FIG. 3, a pressure differential of about 12 kPa (120 mbar) is maintained between the gas chambers 7, 9 and the electrolyte chamber 8. The pressure differential is selected so the interfaces between the potassium hydroxide electrolyte and the gases are at the catalyst layer 5, the position of the interface being regulated by the pressure differential. At the anode 11 (i.e. the negative electrode) a chemical reaction occurs between the hydrogen gas and hydroxide ions of the electrolyte to produce water and electrons. At the cathode 12 a chemical reaction occurs between oxygen gas in the air chamber, water and electrons, to produce hydroxide ions. The electrons travel from the anode 11 to the cathode 12 via an electric circuit (not shown), so there is an electric current. The negative electrolyte pressure in the electrolyte chamber 8 and the hydrophilic substrate 1 create conditions by which the water produced at the anode 11 is drawn into the electrolyte chamber 8, replacing that consumed in the reaction at the cathode 12, and the excess water produced in the reaction evaporates and is removed from the fuel cell 10 in the air exhaust.

Referring now to FIG. 4, a fuel cell assembly is shown; each dashed square encloses a separate group of integrated elements. A fuel cell stack 160 is supplied with hydrogen gas from cylinder 20, which is regulated by 2-stage regulator 25 and controlled by control valve 30. The hydrogen supplied to the hydrogen chambers 7 of the cells in the stack 160 is maintained at a low positive pressure of approximately +2.0 kPa (above atmospheric pressure) by means of the regulator 25 and the control valve 30. The air chambers 9 of the cell stack 160 are supplied with air by air blower 80 at a pressure of +1.8 kPa. Air blown by blower 80 is cleaned by passing through scrubber 90 and filter 100 before it reaches cell stack 160. The hydrogen does not normally flow out of the hydrogen chambers 7 (as it undergoes reaction there). There may be a buildup of contaminants within the hydrogen chambers 7, in which case a purge valve 60 is opened to allow a brief flow of hydrogen through the chambers 7, so that the hydrogen and contaminants are vented through a purge exhaust 70. Air and entrained evaporated water are exhausted through air exhaust 110.

A solution 40 of potassium hydroxide (KOH) in water, which is the cell electrolyte, is circulated by a pump 120 between the cell stack 160 and a tank 170 via heat exchanger 130, which removes excess heat. In the preferred mode of operation the concentration of the electrolyte is constantly approximately 6 M. A depression pump 50 maintains a negative pressure in the electrolyte circuit and is exhausted through depression exhaust 140. It will be appreciated that in the preferred mode of operation of the assembly the concentration of the electrolyte 40 in the cell stack 160 and the tank 170 is substantially constant and thus there is no need for the depression pump 50 to remove the water from the electrolyte.

In operation of the assembly, the depression pump 50 maintains the electrolyte at a pressure below atmospheric pressure, the pressure in the electrolyte chambers 8 of the cell stack 160 being at −10 kPa (below atmospheric pressure) taking into account the effects of the pump 120, and the heat exchanger 130. The cell stack 160 generates electricity, supplied to a circuit through terminals 150.

In a modification to the assembly of FIG. 4 there is no depression pump 50; the electrolyte recirculation pump 120 is at the outlet from the fuel cell stack 160, and there is a restriction at the electrolyte inlet to the fuel cell stack 160. In operation the recirculation pump 120 in combination with the restriction at the inlet ensure that the electrolyte within the stack 160 is at a negative pressure, as described above. In this modification there is also a vent pipe with a vent valve (not shown) at the top of the electrolyte tank 40, so that any gases (such as hydrogen and oxygen) that collect in the tank 40 can be vented at intervals.

Figure 5:
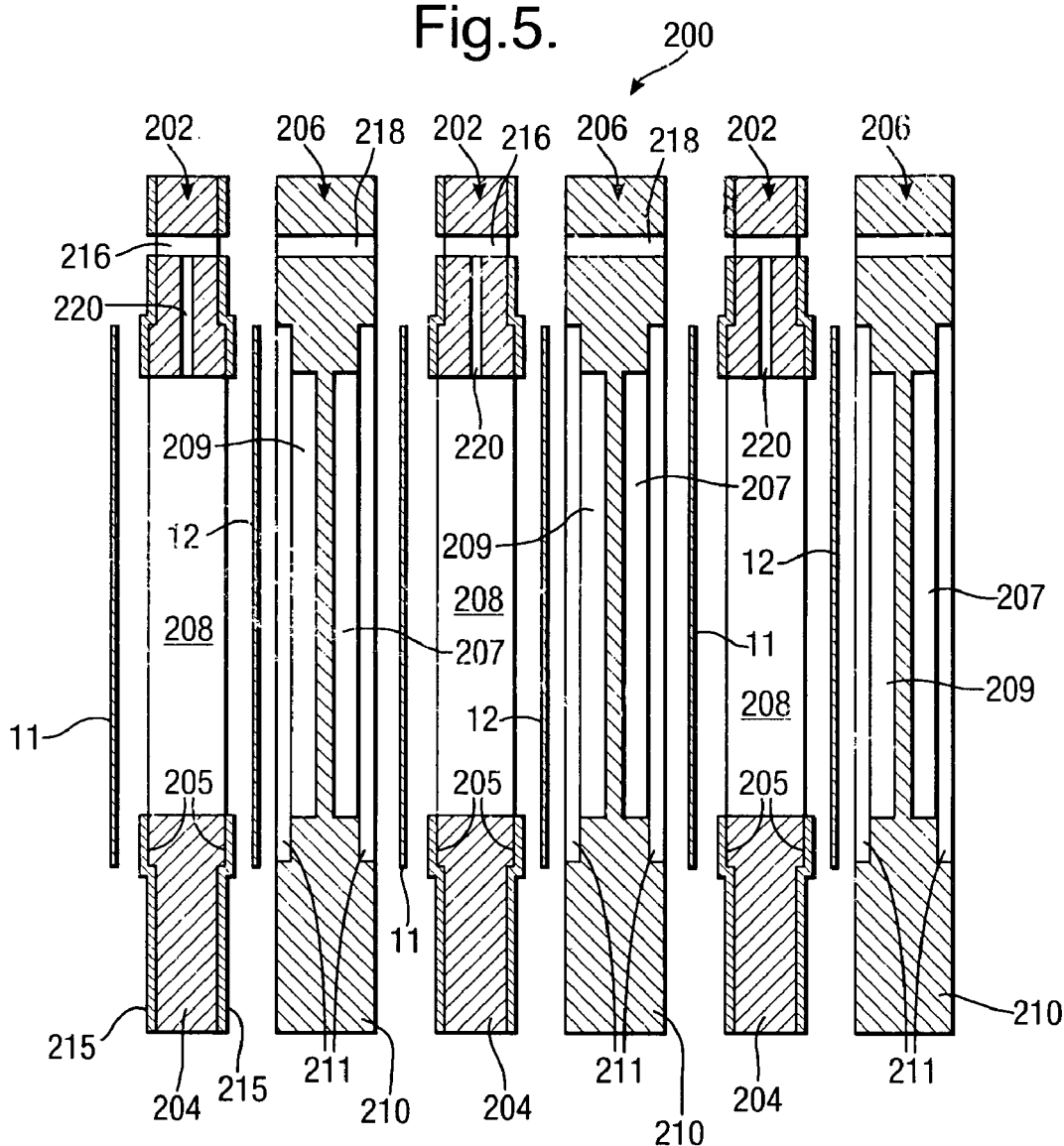
FIG. 5 shows a cross-sectional view of components forming a fuel cell stack, with the components separated for clarity.

Referring now to FIG. 5 there is shown a cross-sectional view through the structural components of a cell stack 200 corresponding to the arrangement of FIG. 2, but with the components separated for clarity. The stack 200 consists of a stack of moulded plastic plates 202 and 206 arranged alternately. The plates 202 define a generally rectangular through-aperture 208 surrounded by a frame 204; the apertures 208 provide the electrolyte chambers 8; immediately surrounding the aperture 208 is a 5 mm wide portion 205 of the frame which projects 0.5 mm above the surface of the remaining part of the frame 204. The plates 206 are bipolar plates; they define rectangular blind recesses 207 and 209 on opposite faces, each recess being about 3 mm deep, surrounded by a frame 210 generally similar to the frame 204, but in which there is a 5 mm wide shallow recess 211 of depth 1.0 mm surrounding each recess. The blind recesses 207 and 209 provide the gas chambers 7 and 9. The apertures 208 may be filled with a loose mesh (not shown) to provide mechanical support for the electrodes 11 and 12.

Electrodes 11 and 12 locate in the shallow recesses 211 on opposite sides of each bipolar plate 206, with the catalyst-carrying face of the electrode 11 or 12 facing the respective blind recess 207 or 209 respectively. Before assembly of the stack components, the opposed surfaces of each frame 204 (including that of the raised portion 205) is covered with gasket sealant 215; this adheres to the frame 204 and dries to give a non-tacky outer surface, while remaining resilient. The components are then assembled as described, so that the raised portions 205 locate in the shallow recesses 211, securing the electrodes 11 and 12 in place. The sealant 215 ensures that electrolyte in the chambers 208 cannot leak out, and that gases cannot leak in, around the edges of the electrodes 11 and 12, and also ensures that gases cannot leak out between adjacent frames 204 and 210.

The surfaces of the frames 210 of the bipolar plates 206, including the outer edge surface, are provided with a nickel coating, for example by electro-less deposition. This coating of nickel provides an electrical connection between an anode 11 on one side and a cathode 12 on the other side, so that the fuel cells 10 are connected in series with each other in the cell stack. This coating may alternatively be of other conducting materials.

In this embodiment the flow of electrolyte to and from the electrolyte chambers 208, and the flows of the gases to and from the gas chambers 207 and 209, follow respective ducts defined by aligned apertures through the plates 202 and 206; only one such set of apertures 216 and 218 are shown. This set of apertures 216 and 218 provides electrolyte to the electrolyte chambers 208 via narrower transverse ducts 220. The sealant 215 is placed so as not to block the apertures 216. The end plates (not shown) of the stack define ports through which the gases and electrolyte flow to or from the stack 200.

Figure 6:
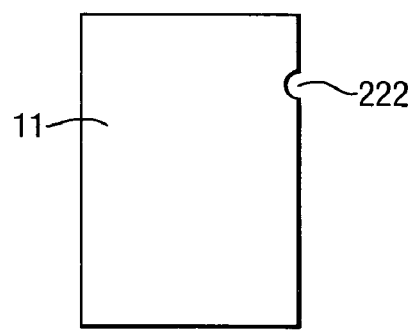
FIG. 6 shows a plan view of an anode from the stack of FIG. 5.

After assembly of the stack 200 the components are secured together for example using a strap (not shown) or by bolts. If it is necessary to replace one of the electrodes 11 or 12, this can be achieved after undoing the strap or bolts, by separating the plates 202 and 206, and replacing the electrode 11 or 12. The gasket material 215 can be peeled off the surface of the plate 202, and fresh gasket material 215 deposited. The electrodes 11 and 12 and the recesses 211 into which they locate may be shaped to ensure that the electrodes 11 or 12 cannot be inserted in the wrong orientation, for example as shown in FIG. 6 the electrodes 11 may be rectangular with a cut-out 222 at one point around the periphery, there being a projection of complementary shape in the corresponding wall of the recess 211.

What is claimed is:

1. A fuel cell assembly comprising at least one fuel cell, each fuel cell comprising two electrodes, the two electrodes being mutually spaced apart so as to form an electrolyte chamber between them for an electrolyte, and with the electrodes respectively separating the electrolyte chamber from a first gas chamber and from a second gas chamber, wherein at least one electrode has a hydrophilic plastic substrate that provides mechanical strength and is of thickness no greater than 500 microns, and is porous, with a conductive layer deposited on only one face of the plastic substrate and at least partly deposited by electroplating, and with catalyst overlying the conductive layer; the electrodes being arranged so the surface facing the liquid electrolyte is the substrate, while the surface facing a gas is the catalyst.

2. The fuel cell assembly as claimed in claim 1, wherein the substrate has a water wicking rate no less than 40 mm per 600 s.

3. The fuel cell assembly as claimed in claim 1, wherein the substrate consists substantially of polyethylene or polypropylene.

4. The fuel cell assembly as claimed in claim 3, wherein the substrate consists substantially of spun fibre and/or spun bonded plastics materials.

5. The fuel cell assembly as claimed in claim 3, wherein the plastic substrate consists substantially of a treated plastics material, the material having been treated to increase the hydrophilicity.

6. The fuel cell assembly as claimed in claim 1, wherein the conductive layer further comprises a protective metal layer.

7. The fuel cell assembly as claimed in claim 1, wherein the electrodes are supported by support plates, and wherein the electrolyte chambers are defined by electrolyte chamber plates, wherein the electrodes are removable from the support plates and from the electrolyte chamber plates for replacement.

8. The fuel cell assembly as claimed in claim 7, wherein the electrodes and the electrode support plates are shaped to ensure insertion of the electrodes in the correct orientation.

9. The fuel cell assembly as claimed in claim 7, wherein the electrolyte chamber plates are provided on each face with resilient gasket material with a non-tacky surface to seal to adjacent components.

10. The fuel cell assembly as claimed in claim 7, wherein the electrode support plates are of plastic material, and a metal coating on the support plates provides electrical contact between electrodes on opposite sides thereof.

11. The fuel cell assembly as claimed in claim 1, also comprising means to maintain a pressure differential between the electrolyte chamber and at least one of the gas chambers during operation, the pressure differential being lower than the bubble point of the respective electrode.

12. The fuel cell assembly as claimed in claim 11, wherein the pressure differential is such that the electrolyte is at a negative pressure.

13. A fuel cell assembly comprising at least one fuel cell, each fuel cell comprising two electrodes, the two electrodes being mutually spaced apart so as to form an electrolyte chamber between them for an electrolyte, and with the electrodes respectively separating the electrolyte chamber from a first gas chamber and from a second gas chamber, wherein at least one electrode has a hydrophilic plastic substrate that provides mechanical strength, and is porous, with a conductive layer and catalyst deposited on only one face of the plastic substrate; the electrodes being arranged so the surface facing the liquid electrolyte is the substrate, while the surface facing a gas comprises the catalyst; wherein the assembly comprises a stack of moulded plastic plates to define electrolyte chambers and moulded plastic plates to act as bipolar electrodes connecting successive cells in the stack; the bipolar electrode plates being coated with metal at least around their edges to provide electrical connection between electrodes on opposite sides thereof; and the plates defining the electrolyte chambers being provided on each face with resilient gasket material with a non-tacky surface.

14. The fuel cell assembly as claimed in claim 13, wherein the electrodes and the bipolar electrode plates are shaped to ensure insertion of the electrodes in the correct orientation.

* * * * *